United States Patent
Okazaki et al.

(10) Patent No.: US 7,368,669 B2
(45) Date of Patent: May 6, 2008

(54) SCALE THAT AUTOMATICALLY INCREASES THE NUMBER OF DISPLAYED DIGITS AS THE MEASURED WEIGHT APPROACHES THE TARGET WEIGHT

(75) Inventors: Minoru Okazaki, Tokyo (JP); Masaaki Kobayashi, Tokyo (JP)

(73) Assignee: Shinko Denshi Company Limited, Tokyo (JP)

( * ) Notice: Subject to any disclaimer, the term of this patent is extended or adjusted under 35 U.S.C. 154(b) by 0 days.

(21) Appl. No.: 10/593,614

(22) PCT Filed: Mar. 28, 2005

(86) PCT No.: PCT/JP2005/005722

§ 371 (c)(1),
(2), (4) Date: Jan. 8, 2007

(87) PCT Pub. No.: WO2005/095906

PCT Pub. Date: Oct. 13, 2005

(65) Prior Publication Data

US 2007/0199740 A1     Aug. 30, 2007

(30) Foreign Application Priority Data

Mar. 30, 2004    (JP) ............................. 2004-097600

(51) Int. Cl.
G01G 23/00    (2006.01)
(52) U.S. Cl. .................... 177/25.13; 702/101; 177/116
(58) Field of Classification Search ............. 177/25.13, 177/116, 177; 702/101

See application file for complete search history.

(56) References Cited

U.S. PATENT DOCUMENTS 4,149,605 A * 4/1979 Mettler et al. .............. 177/173

(Continued)

FOREIGN PATENT DOCUMENTS

JP         63-051490 B2    10/1988

(Continued)

*Primary Examiner*—Randy W Gibson
(74) *Attorney, Agent, or Firm*—Frishauf, Holtz, Goodman & Chick, P.C.

(57) ABSTRACT

It is possible to rapidly and accurately reach a target value while putting a material to be weighed. In step S1, a target value is set. Putting in of a material is started. Control is passed to step S2 and step S3 and a numerical value A at the digit of thousand is displayed. After the putting in is continued, in step S5, S-W<1000 is obtained. Control is passed to step 56 and step S7, where in addition to the numerical value A of the digit of thousand, a numerical value B of the digit of hundred is also displayed while ignoring the numeric values C and D of the digits of ten and one. In step S8, S-W<100 is obtained. Control is passed to step S9 and step S10, where in addition to the numerical values A of the digit of thousand and the numerical value B of the digit of hundred, the numerical value C of the digit of ten is also displayed while ignoring the value D of the digit of one. In step S11, after S-W<10 is obtained, control is passed to step S12 and step S13, where in addition to the numerical values A, B, C, the numerical value D is displayed. A small amount of the material (powder) to be weighed is put in to obtain a final weight value.

4 Claims, 3 Drawing Sheets

(a)

(b)

(c)

(d)

U.S. PATENT DOCUMENTS

| | | | |
|---|---|---|---|
| 4,156,472 A | * 5/1979 | Kunz | 177/25.13 |
| 4,171,026 A | * 10/1979 | Gallo et al. | 177/25.13 |
| 4,344,494 A | * 8/1982 | Knothe et al. | 177/210 R |
| 4,685,525 A | * 8/1987 | Knothe et al. | 177/25.17 |
| 4,696,359 A | * 9/1987 | Glibbery | 177/211 |

FOREIGN PATENT DOCUMENTS

| | | | |
|---|---|---|---|
| JP | 02-59413 B2 | 12/1990 | |
| JP | 03-282331 A | * 12/1991 | 177/177 |

* cited by examiner

Fig. 3

Step S1: set predetermined weight S

Step S2: predetermined weight S > measured weight W?
- N → Step S4: alarm → (return to Step S1)
- Y ↓

Step S3: digit A of the thousand is displayed

Step S5: predetermined weight S - measured weight W < 1000?
- N → Step S4: alarm
- Y ↓

Step S6: predetermined weight S > measured weight W?
- N → (back to Step S3)
- Y ↓

Step S7: digit A of the thousand and digit B of the hundred are displayed

Step S8: predetermined weight S - measured weight W < 100?
- N → (back to Step S6)
- Y ↓

Step S9: predetermined weight S > measured weight W?
- N → (back to Step S6)
- Y ↓

Step S10: digit A of the thousand, digit B of the hundred, digit C of the ten are displayed Step S11: predetermined weight S - measured weight W < 10?
- N
- Y ↓

Step S12: predetermined weight S > measured weight W?
- N
- Y ↓

Step S13: digit A of the thousand, digit B of the hundred, digit C of the ten, digit D of the unit are displayed

SCALE THAT AUTOMATICALLY INCREASES THE NUMBER OF DISPLAYED DIGITS AS THE MEASURED WEIGHT APPROACHES THE TARGET WEIGHT

FIELD OF THE INVENTION

The present invention relates to a digital weighing device for measuring a given amount of substances such as powder and liquid, while the substances are put on weighing pan continuously during measurement.

This application is a U.S. National Phase Application under 35 USC 371 of International Application PCT/JP2005/005722 filed Mar. 28, 2005.

RELATED ART STATEMENTS

Heretofor, a mechanical analog weighing device has been generally used for measuring a weight of substances such as powders, particles and liquid.

There have been also used a digital weighing device, in which a measured result, i.e. a weight of substances placed on a weighing pan is displayed on a liquid crystal display panel. Such a digital weighing device has been widely used as a convenient tool provided in a store for displaying a total price which is obtained by multiplying a measured weight of a substance with a unit price thereof.

DISCLOSURE OF THE INVENTION

Problems to be Solved by the Invention

In the known analog weighing device, since a measuring resolution denoted by an indicating needle is low, it is impossible to perform a highly accurate measurement.

In the known digital weighing device, when it is required to put a predetermined amount of powder in a vessel placed on a weighing pan, at first, an estimated amount of powder is put into the vessel. Then, displayed figures change rapidly, and it is difficult for a user to read indicated figures. Therefore, when a predetermined amount of power is to be put into the vessel placed on the weighing pan, it is required to put a small amount of powder into the vessel successively. Particularly, a measured weight becomes close to the predetermined weight, a smaller amount of powder has to be added successively. Therefore, in some cases, it takes a longer time until the predetermined amount of powder is put into the vessel as compared with the analog weighing device.

The present invention has for its object to provide a digital weighing device, in which articles to be measured can be placed on a weighing pan while a measured weight displayed on a display panel can be monitored easily.

Means for Solving the Problems

According to the invention, a digital weighing device comprising a weighing means for measuring a weight of articles placed on a weighing pan, a display means for displaying a measured weight provided by the weighing means as a digital value, a weight setting means for setting a predetermined weight of articles, and a control section for comparing the measured weight and the predetermined weight set by said weight setting means and controlling respective digits of the digital value displayed on said display means for denoting the measured weight, characterized in that the number of effective digits in the display means is successively increased in accordance with an approach of said measured weight to said predetermined weight.

According to the invention, a digital weighing device comprising a weighing means for measuring a weight of articles placed on a weighing pan, a display means for displaying a price of measured articles as a digital value, said price being obtained by calculating a measured weight provided by the weighing means, a price setting means for setting a predetermined price of articles, and a control section for comparing a price of the measured articles and the predetermined price set by said price setting means and controlling respective digits of the digital value displayed on said display means for denoting a price of the measured articles, characterized in that the number of effective digits in the display means is successively increased in accordance with an approach of said price of the measured articles to said predetermined price.

Effect of the Invention

In the digital weighing device according to the invention, the digits of the displayed digital value is controlled in accordance with the predetermined value, a user can easily and correctly estimate an amount of articles to be put on the weighing pan by a single putting-on operation, and therefore an amount or a price of measured articles put on the weighing pan can be easily made identical with the predetermined amount or price within a short time period. In this manner, a rapid measurement can be performed.

BRIEF DESCRIPTION OF THE DRAWINGS

FIG. 3 is a flow chart representing an operational algorism; and

Figure 1:
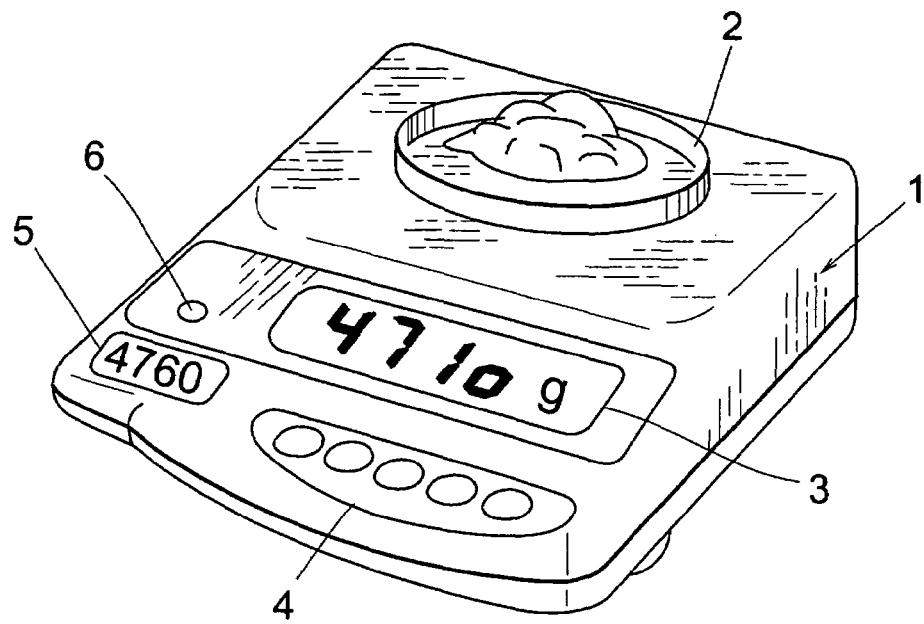
FIG. 1 is a perspective view showing an embodiment of the digital weighing device according to the invention.

EXPLANATION OF THE NUMERICAL REFERENCES 1 housing
2 weighing pan
3 display section
4 manual button
5 weight setting section
6 alarm lamp
7 weighing section
8 control section

BEST MODE OF THE INVENTION

FIG. 1 is a perspective view showing an embodiment of the digital weighing device according to the invention. Within a housing 1 of the digital weighing device, there is provided a weighing section for measuring a weight of articles placed on a weighing pan 2 arranged on to top plate of the housing 1, said weighing pan being coupled with a weighing unit provided within the weighing section. On a front panel of the housing 1, there are provided a digital display section 3 for displaying a measured weight, a plurality of manual buttons 4 including a switches for operating the weighing device, a weight setting section 5 for setting a predetermined weight S which can be entered by operating the manual buttons 4, and an alarm lamp 6.

Figure 2:
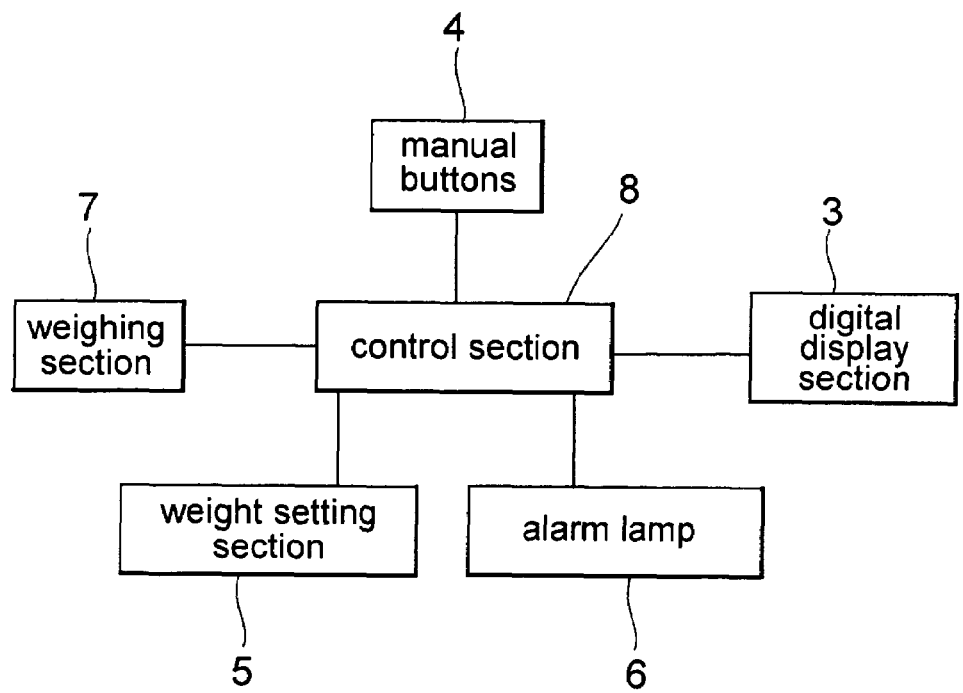
FIG. 2 is a block diagram thereof.

FIG. 2 is a block diagram illustrating a construction of the digital weighing device. An output of the weighing section 7 provided within the housing 1, the manual buttons 4 and an output of the weight setting section 5 are connected to a control section 8. An output of the control section 8 is connected to the digital display section 3 and alarm lamp 6.

When a certain amount of articles is placed on the weighing pan 2, a weight of these articles is measured by the weighing section 7 and a value of the measured weight is displayed on the display section 3 through the control section 8. In the control section 8, a weight value W supplied from the weighing section 7 is picked-up with a suitable sampling period and a sampled weight is compared with a predetermined weight S set in the weight setting section 5 to determine the number of effective digits of the displayed weight value. As long as the measured weight W differs largely from the predetermined weight S, the number of effective digits is decreased.

There are several algorisms for controlling the number of effective digits. In the present embodiment, the number of digits of a weight value displayed on the display section 3 is set to four, so that a weight of 0-9999 grams may be displayed, and a measured weight value is displayed in the following manner:

TABLE 1

|     |                  | digit of the thousand | digit of the hundred | digit of the ten | digit of the unit |
|-----|------------------|-----------------------|----------------------|------------------|-------------------|
| (a) | S − W > 1000     | A                     | x                    | x                | x                 |
| (b) | 1000 > S − W > 100 | A                   | B                    | x                | x                 |
| (c) | 100 > S − W > 10 | A                     | B                    | C                | x                 |
| (d) | 10 > S − W       | A                     | B                    | C                | D                 |

In the above table 1, the reference characters A, B, C and D denotes figures corresponding to digits of the thousand, the hundred, the ten and the one, respectively and a measured weight W may be expressed by W=1000A+100B+10C+D. The reference mark x denotes that a special mark or a fixed value is displayed.

FIG. 3 is a flow chart representing an operational algorism. In the present example, a predetermined weight S is set to 4760 grams.

At first, in a step S1, a user sets the predetermined weight S of powder using the manual buttons 4 and weight setting section 5. Then, the user initiates to put a certain amount of powder on the weighing pan. In a step S2, it is judged in the control section weather or not a measured weight W exceeds the predetermined weight S. If the measured weight W does not exceeds the predetermined weight S, the program goes to a step S3, in which a digit A of the thousand is displayed. However, if the measured weight W exceeds the predetermined weight S, the program goes to a step S4 and the alarm lamp 6 is lit. Also in succeeding steps S6, S9 and S12, if S<W, the alarm lamp 6 is lit on and the user can know that an excessive amount of powder has been put on the weighing pan 2. In such a case, when the user removes a certain amount of powder prom the weighing pan 2, the program goes back to the step S2 and the measurement is restarted.

Figure 4:
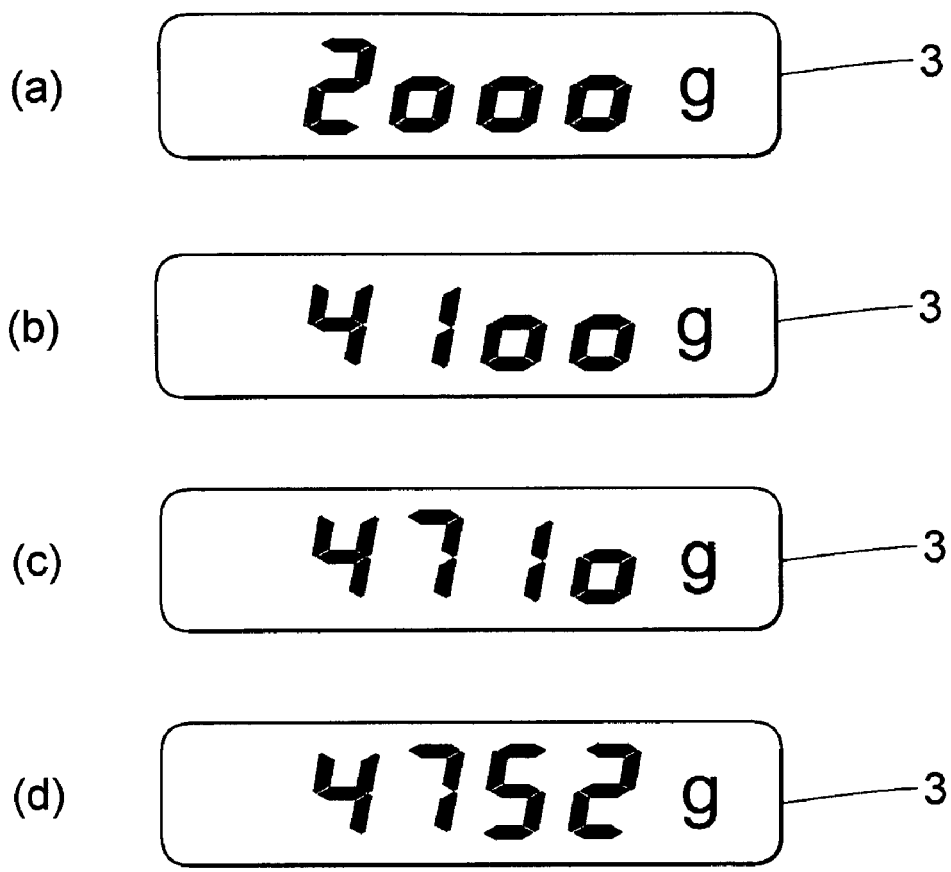
FIG. 4 is an explanatory drawing showing display modes in a display section.

In the step S3, a digit A is displayed on the digital display section 3 at a digit of the thousand in accordance with a column (a) in the table 1 under the control of the control section 8, and at the remaining digits, i.e. a digit of the hundred, a digit of the ten and a digit of the unit, on the digital display section 3, small marks [0] are displayed as shown in FIG. 4(a), while digits B, C and D of a measured weight W are ignored.

When the digit A of the thousand is displayed, a relatively larger amount of powder may be put on the weighing pan with a unit of 1000 grams. When S−W<1000 is detected in a step S5, then in a step S6, it is judged weather or not the measured weight W is smaller than the predetermined weight S and further in a step S7, a digit B of the hundred of the measured weight W is displayed in addition to the display of the substantially fixed digit A of the thousand, i.e. [4] as shown in FIG. 4(b) in accordance with a column (b) in the table 1. In this case, digits C and D of the ten and the unit, respectively of the measured weight W are ignored. This means that an amount of powder W put on the weighing pan differs from the predetermined weight S by an amount smaller than 1000 grams and therefore, the user may advantageously put powder on the weighing pan with a unit of 100 grams.

While the digits A and B are displayed, the user puts the powder on the weighing pan with a unit of 100 grams and when it is judged that S−W<100 in a step S8, the digit B of the hundred is fixed to [7]. Then, in a step S9, weather or not the measured weight W is smaller than the predetermined weight S, and in a step S10, a digit B of the ten of the measured weight W is displayed in addition to the digits A=4 and B=7 of the thousand and hundred, respectively as depicted in FIG. 4(c) in accordance with a third column (c) in the table 1. In this case, a digit D of the unit of the measured weight W is ignored.

After the digit C is displayed, the user may put a smaller amount of powder on the weighing pan with a unit of 10 grams. When it is judged in a step S11 that S−W<10, in a step S12, it is judged weather or not the measured weight W is smaller than the predetermined weight S and further in a step S12, a digit D of the unit of the measured weight W is displayed in addition to the digits A=4, B=7 and C=5 as shown in FIG. 4(d) in accordance with a fourth column (d) in the table 1. This means that an amount of the powder put on the weighing pan differs from the predetermined weight S only by an amount smaller than 10 grams. Then, the user puts a relatively smaller amount of powder on the weighing pan while watching a digit D of the unit until the displayed digit D of the unit becomes [0] of the predetermined weight S. In this manner, the measured weight W=4760 grams of powder put on the weighing pan can be brought into the predetermined amount S.

In the present invention, since the number of effective digits of a measured weight is changed in accordance with an amount of articles put on the weighing pan, the user can estimate correct amounts of articles to be put on the weighing pan during the measurement. Therefore, the operation of adding articles on the weighing pan can be performed by a suitable number of times and a possibility of adding an excess amount of articles can be reduced. In this manner, the user can measure the predetermined amount of articles easily within a short time period.

In the above embodiment, the number of effective digits of a measured weight displayed on the digital display section is increased one by one, but according to the invention, two effective digits may be increased at a time by suitably operating the manual buttons 4. Furthermore, when a predetermined weight is cleared by operating the manual buttons 4, the digital weighing device operates as a conventional digital scale and all digits are displayed during the measurement.

In the above explained embodiment, a digit or digits other than an effective digit or digits are ignored, but according to the invention, they may be displayed as [0] and [5]. In this case, the user can guess an amount of articles placed on the weighing pan with watching one or more less significant digits of [0] and [5].

In the embodiment explained above, the number of digits is set to four, but according to the invention more than four digits may be displayed.

In price scales generally used in retail stores, a price of articles put on the weighing pan is calculated by a calculating section using a unit price of the articles and digits of a calculated price are displayed on the digital display section and a predetermined price is set by a price setting section similar to the abovementioned weight setting section. Then, a price of articles put on the weighing pan may be displayed in the entire same algorism as that explained above.

The invention claimed is:

1. A digital weighing device comprising a weighing means for measuring a weight of articles placed on a weighing pan, a display means for displaying a measured weight provided by the weighing means as a digital value, a weight setting means for setting a predetermined weight of articles, and a control section for comparing the measured weight and the predetermined weight set by said weight setting means and controlling respective digits of the digital value displayed on said display means for denoting the measured weight, characterized in that the number of effective digits in the display means is successively increased in accordance with an approach of said measured weight to said predetermined weight.

2. A digital weighing device comprising a weighing means for measuring a weight of articles placed on a weighing pan, a display means for displaying a price of measured articles as a digital value, said price being obtained by calculating a measured weight provided by the weighing means, a price setting means for setting a predetermined price of articles, and a control section for comparing a price of the measured articles and the predetermined price set by said price setting means and controlling respective digits of the digital value displayed on said display means for denoting a price of the measured articles, characterized in that the number of effective digits in the display means is successively increased in accordance with an approach of said price of the measured articles to said predetermined price.

3. The digital weighing device according to claim 1 or 2, characterized in that the least significant digit among the displayed effective digits is set as a measure of an amount of articles which is to be put on the weighing pan by a single putting operation.

4. The digital weighing device according to claim 1 or 2, characterized in that at least one digit other than the effective digits is displayed as a fixed digit or a special mark.

* * * * *